July 9, 1929.    A. G. ANDERSON    1,720,408
SEPARABLE FASTENER INSTALLATION
Filed July 22, 1927
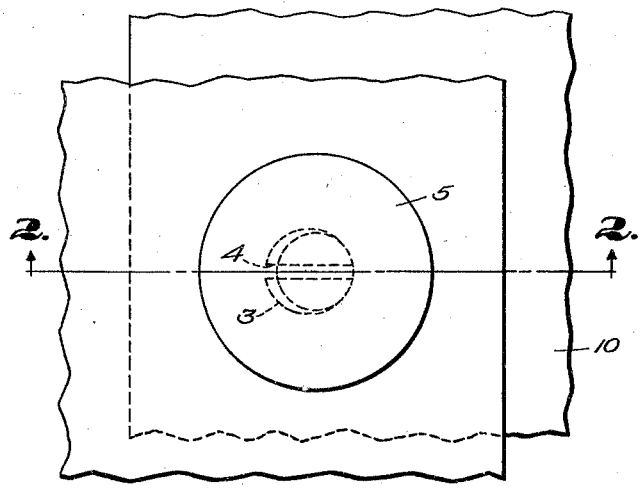
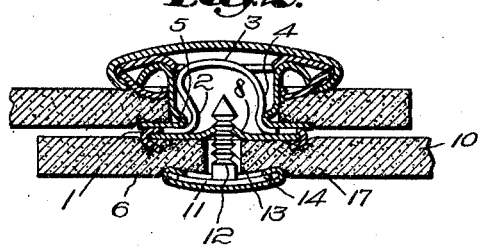
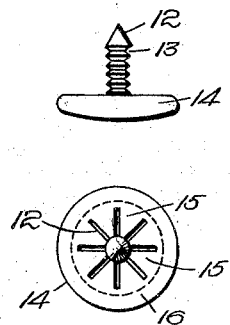
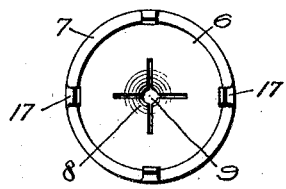
Inventor:
Andrew G. Anderson
by Emery, Booth, Janney & Varney
Attys Patented July 9, 1929.

1,720,403

UNITED STATES PATENT OFFICE.

ANDREW G. ANDERSON, OF WOLLASTON, MASSACHUSETTS, ASSIGNOR, BY MESNE ASSIGNMENTS, TO CARR FASTENER COMPANY, A CORPORATION OF MASSACHUSETTS.

SEPARABLE FASTENER INSTALLATION.

Application filed July 22, 1927. Serial No. 207,679.

My invention aims to provide improvements in separable fastener installations.

In the drawings, which illustrate a preferred embodiment of the invention:—

Figure 1 is a plan view showing a stud and socket installation;

Fig. 2 is a section taken on the line 2—2 of Fig. 1;

Fig. 3 includes a side and a plan view, respectively, of the attaching element, or nail, of the installation; and Fig. 4 is a bottom view of the stud member of the installation.

Referring to the drawings, I have shown a stud and socket particularly, though not exclusively, useful in connection with wearing apparel.

The stud portion of the stud installation and the socket installation are substantially the same as shown and described in my co-pending application Serial No. 157,967, filed Dec. 30, 1926, and are shown merely for the purpose of illustration. Other types of fastener elements may be attached, in the manner hereinafter described, with equally satisfactory results.

The stud member has a base 1, a neck 2 and a head 3, the head and neck being divided by a slit 4 to permit contraction and expansion of the head for engagement with the socket 5, as shown in Fig. 2. The head is offset relative to the neck to provide for three-side locking engagement with the socket, as more fully described in the above-mentioned co-pending application.

An attaching part 6 is secured to the base of the stud member by turning the edge 7 of the base 3 over the edge of the part 6, as shown in Figs. 2 and 4. This attaching part 6 is provided with a number of yieldable fingers 8 pressed toward the head 3 of the stud. The ends of the fingers terminate about an aperture 9 (Fig. 4), which is normally located above the plane of the attaching part 6, as shown in Fig. 2.

The stud unit is secured to the carrying medium 10 by means of an attaching element having a head seated against one side of the carrying medium and a shank extending through the carrying medium and engaging the attaching part 6, as illustrated by Fig. 2.

In this application the attaching element (Figs. 2 and 3) includes a nail part having a head 11 and a shank portion 12. The shank portion is provided with annular grooves 13. A cap part 14 is secured to the head 11 of the nail part. The head 11 of the ordinary nail is too small to permit a cap to be fitted thereto in the usual manner of turning a portion of the cap under the head of the nail, as the cap would not be large enough to overlie an area of the carrying medium sufficient to provide a durable grip thereon between the cap and the base of the stud member. Therefore, when a larger cap than the head of the nail is desired, I provide a number of petal-like portions 15 (Fig. 3) extending inwardly from the edge of the continuous flange portion 16 at the under side of the nail head 11. These petal-like portions extend to the shank 12 of the nail and serve the double purpose of securing the cap part 14 to the nail head 11 and preventing substantial lateral movement of one relative to the other.

When the stud member is secured to the carrying medium 10, the shank 12 of the nail is forced between the fingers 8, the free ends of which snap into the annular grooves 13, as shown in Fig. 2. Because of the fact that the fingers 8 are bent upwardly toward the head 3 of the stud, the nail cannot be withdrawn. Any stress tending to separate the parts of the stud assembly tends to reduce the size of the aperture 9 and the fingers 8 grip the shank more tightly. By this method of attachment the carrying medium is gripped tightly between the parts of the stud installation by the use of the least number of parts.

The spurs 17 formed at the under side of the stud member (Figs. 2 and 4) press tightly into the carrying medium and prevent turning of the stud part. Thus the stud may be located in a predetermined relation to the carrying medium, as is necessary with this type of stud, and it will be held in the position desired.

I do not wish to be limited to the particular structure illustrated and described, my invention being best defined in the following claims.

Claims:

1. A fastener stud installation comprising a stud member having a base, a neck and a head, the head being offset relative to the neck to provide for three-side locking engagement with a socket, an attaching part secured to the base of the stud member, a stud-carrying medium, said attaching part having plural yieldable fingers arranged about an aperture through said attaching part, an attaching element having a head seated against the stud-carrying medium and a shank extending through the carrying medium and making positive locking engagement with the said fingers to prevent separation of the stud from the carrying medium, and means forming part of the assembly for preventing turning of the stud relative to the stud-carrying medium.

2. A fastener stud installation comprising a stud member having a base, a neck and a head, the head being offset relative to the neck to provide for three-side locking engagement with a socket, an attaching part secured to the base of the stud member, a stud-carrying medium, said attaching part having plural yieldable fingers arranged about an aperture through said attaching part, and an attaching element having a flanged portion seated against the stud-carrying medium and a shank extending through the carrying medium and making positive locking engagement with the said fingers to prevent separation of the stud from the carrying medium, the said carrying medium being held tightly between the head of the attaching element and the base of the stud member and spurs provided by the stud member, said spurs being embedded in the carrying medium to prevent turning of the stud so that it may be held in a predetermined relation to the carrying medium.

3. A fastener stud installation comprising a stud member having a base, a neck and a head, the head being offset relative to the neck to provide for three-side locking engagement with a socket, an attaching part secured to the base of the stud member, a stud-carrying medium, an attaching part having plural yieldable fingers arranged about an aperture through said attaching part, an attaching element having a head and a shank portion, a cap part secured to said head, said cap being substantially larger in diameter than the head of the attaching element and being secured thereto by a plurality of laterally abutting petal-like portions extending to the shank of the attaching element beneath the head thereof to prevent lateral movement of the cap relative to the head of the attaching element and said shank extending through the carrying medium and making positive locking engagement with the said fingers to prevent separation of the stud from the carrying medium and means forming part of the assembly for preventing turning of the stud relative to the stud-carrying medium.

4. A fastener stud installation comprising a stud member having a base, a neck and a head, the head being offset relative to the neck to provide for three-side locking engagement with a socket, an attaching part secured to the base of the stud member, a stud-carrying medium, an attaching part having plural yieldable fingers arranged about an aperture through said attaching part, an attaching element having a head and a shank portion, a cap part secured to said head, said cap being substantially larger in diameter than the head of the attaching element and being secured thereto by inwardly extending petal-like portions pressed against the under side of the head to secure the cap part thereto and said shank extending through the carrying medium and making positive locking engagement with the said fingers to prevent separation of the stud from the carrying medium and means forming part of the assembly for preventing turning of the stud-carrying medium.

In testimony whereof, I have signed my name to this specification.

ANDREW G. ANDERSON.